United States Patent
Zhao et al.

(10) Patent No.: US 11,988,921 B1
(45) Date of Patent: May 21, 2024

(54) LIGHT BOARDS, METHODS OF MANUFACTURING A LIGHT BOARD, AND SPLICED DISPLAY DEVICES

(71) Applicant: TCL China Star Optoelectronics Technology Co., Ltd., Guangdong (CN)

(72) Inventors: Bin Zhao, Guangdong (CN); Juncheng Xiao, Guangdong (CN); Hongyuan Xu, Guangdong (CN); Shi Tang, Guangdong (CN); Meinan Li, Guangdong (CN); Yu Liu, Guangdong (CN); Guangmiao Wan, Guangdong (CN); Bizhang Zhu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/193,834

(22) Filed: Mar. 31, 2023

(30) Foreign Application Priority Data

Dec. 31, 2022 (CN) .......................... 202211740398.3

(51) Int. Cl.
*G02F 1/1335* (2006.01)
*G02F 1/1333* (2006.01)
*G02F 1/13357* (2006.01)

(52) U.S. Cl.
CPC .... *G02F 1/133612* (2021.01); *G02F 1/13336* (2013.01); *G02F 1/133603* (2013.01)

(58) Field of Classification Search
CPC ........... G02F 1/133612; G02F 1/13336; G02F 1/133603
See application file for complete search history.

(56) References Cited

U.S. PATENT DOCUMENTS

2021/0406505 A1* 12/2021 Hai ........................ H04N 25/13

FOREIGN PATENT DOCUMENTS

CN 109727901 A * 5/2019
CN 112071830 A * 12/2020 ............... G09F 9/33

OTHER PUBLICATIONS

Liu, CN 112071830, Dec. 2020 (Year: 2020).*
Yuan et al., CN 109727901, May 2019 (Year: 2019).*

* cited by examiner

*Primary Examiner* — Mary Ellen Bowman
(74) *Attorney, Agent, or Firm* — Nathan & Associates; Menachem Nathan

(57) ABSTRACT

A light board includes a light-emitting unit array including a plurality of light-emitting units arranged in an array and a driver backplane disposed on a backlight side of the light-emitting unit array. The driver backplane includes a base, a trace layer, and an insulating protection layer stacked successively in a direction away from the light-emitting unit array. The trace layer includes a plurality of traces and one or more bonding terminals each electrically connected to one of the traces. An orthographic projection of the insulating protection layer on the base overlaps the traces. The insulating protection layer includes one or more first opening each exposing one of the bonding terminals. The insulating protection layer is disposed on an outermost side of the side of the driver backplane away from the light-emitting unit array.

18 Claims, 4 Drawing Sheets

LIGHT BOARDS, METHODS OF MANUFACTURING A LIGHT BOARD, AND SPLICED DISPLAY DEVICES

CROSS-REFERENCE TO RELATED APPLICATION

This application claims priority to Chinese Patent Application No. 202211740398.3, filed on Dec. 31, 2022, the disclosure of which is incorporated herein by reference in its entirety.

TECHNICAL FIELD

The present disclosure relates to the technical field of display technologies, and in particular, to light boards, methods of manufacturing a light board, and spliced display devices.

BACKGROUND

With the development of electronic industries, a demand for various large-sized display devices is increasing, and the applications in various scenes are becoming more and more extensive. Therefore, spliced display devices, such as liquid crystal display (LCD for short) spliced display devices, are also attracting more and more attention. Multiple LCD screens may be spliced in one spliced display device to realize a large-sized display screen according to actual display needs, and the large-sized display screens have advantages of clear display and high flexibility.

However, the LCD spliced display devices generally have a problem of large splicing gaps. In the related art, a micro light emitting diode (LED for short) light board with a display function is generally arranged to correspond to the splicing gap between two adjacent LCD display panels to relieve the problem. Referring to FIG. 1, the micro LED light board includes a driver backplane 10', an LED array 20', and an encapsulation adhesive layer 30'. The LED array 20' and the encapsulation adhesive layer 30' are disposed on a side of the driver backplane 10'. In order to reduce a height difference between the micro LED light board and the LCD display panel, a thickness of the driver backplane 10' needs to be strictly controlled. Accordingly, deformation resistance of the driver backplane 10' is weakened.

In the related art, the driver backplane 10' includes a base 11', a trace layer 12', a black ink layer 13', and a white screen-printing ink 14' successively stacked in a direction away from the LED array 20'. A thickness of the white screen-printing ink 14' is not less than a thickness of the black ink layer 13'. The trace layer 12' includes bonding terminals 121' configured to electrically connect with a driver chip. Areas corresponding to the bonding terminals 121' are not provided with the black ink layer 13' and the white screen-printing ink 14'. Accordingly, a side of the driver backplane 10' away from the LED array 20' has the lowest point A' on a surface of the bonding terminal 121' away from the LED array 20' and the highest point B' on a surface of the white screen-printing ink 14' away from the LED array 20'. Thus, a height difference between the lowest point A' and the highest point B' of the side of the driver backplane 10' away from the LED array 20' is large. On the other hand, during an encapsulation process of the micro LED light board, the driver backplane 10' needs to be pressed so that the LED array 20' on a side of the driver backplane 10' is pressed and encapsulated with the encapsulation adhesive layer 30'. With the pressing process, a deformation of the driver backplane 10' of the encapsulated micro LED light board is large due to the large height difference between the lowest point A' and the highest point B'. Thus, a brightness uniformity of the LED array 20' disposed on a side of the driver backplane 10' is poor.

SUMMARY

In view of above, a light board according to an embodiment of in the present disclosure is provided. The light board includes a light-emitting unit array including a plurality of light-emitting units arranged in an array and a driver backplane disposed on a backlight side of the light-emitting unit array and electrically connected to the light-emitting units; the driver backplane includes a base, a trace layer, and an insulating protection layer stacked successively in a direction away from the light-emitting unit array; the trace layer includes a plurality of traces and one or more bonding terminals each electrically connected to one of, the traces; an orthographic projection of the insulating protection layer on the base overlaps the traces, the insulating protection layer includes one or more first openings each exposing one of the bonding terminals, and the insulating protection layer is disposed on an outermost side of the driver backplane away from the light-emitting unit array.

In addition, a method of manufacturing a light board according to an embodiment of the present disclosure is provided. The method includes following steps:

forming a combination structure by combining a light-emitting unit array and a driver backplane, herein, the light-emitting unit array includes a plurality of light-emitting units arranged in an array; the driver backplane is disposed on a backlight side of the light-emitting unit array and is electrically connected to the light-emitting units, the driver backplane includes a base, a trace layer, and an insulating protection layer stacked successively in a direction away from the light-emitting unit array; the trace layer includes one or more bonding terminals; the insulating protection layer includes one or more first openings each exposing one of the bonding terminals and is disposed on an outermost side of the driver backplane away from the light-emitting unit array;

providing a first mold including a first recess, at least a part of the driver backplane being embedded in the first recess so that the driver backplane is in contact with a bottom of the first recess and each of the light-emitting units completely protrudes out of the first recess;

providing a second mold including a second recess filled with an encapsulation adhesive layer;

pressing the first mold and the second mold against each other so that the encapsulation adhesive layer contacts the light-emitting unit array and the driver backplane; and removing the first mold and the second mold, so that the driver backplane, the light-emitting unit array, and the encapsulation adhesive layer together form the light board, herein, the encapsulation adhesive layer is fixed on a surface of the driver backplane facing the light-emitting unit array and coats each of the light-emitting units.

In addition, a spliced display device according to an embodiment of the present disclosure is provided. The spliced display device includes a plurality of display panels and one or more above light boards, any two adjacent ones of the display panels being spliced with each other, and the display panels each include a display area and a non-display area, the light boards are each disposed on a light-emitting side of the display panels and each corresponds to the non-display areas of spliced display panels.

Figure 1:
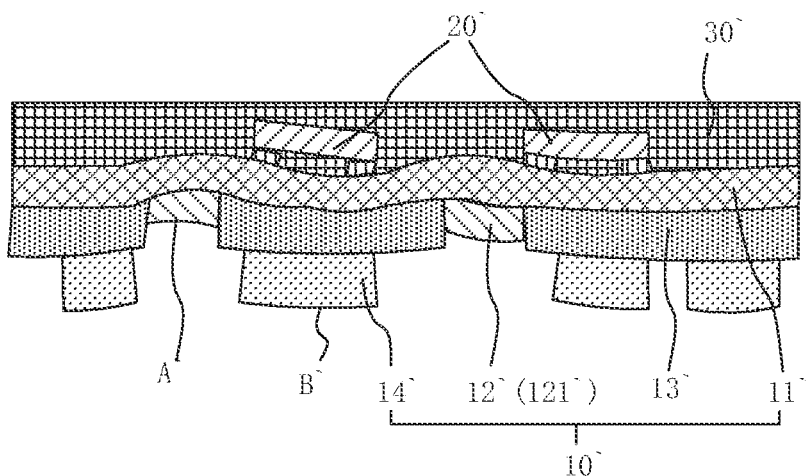
FIG. 1 is a schematic structural view of an encapsulated micro LED light board in the related art.

LIST OF REFERENCE NUMERALS IN THE DRAWINGS driver backplane 10'; LED array 20'; encapsulation adhesive layer 30'; base 11'; trace layer 12'; bonding terminal 121'; black ink layer 13'; white screen-printing ink 14'; lowest point A'; highest point B';

driver backplane 10; light-emitting unit array 20; light-emitting unit 21; encapsulation adhesive layer 30; base 11; trace layer 12; bonding terminal 121; trace 122; insulating protection layer 13; first opening 01; second opening 02; first part 131; second part 132; lowest point A; highest point B; first mold 100; first recess 101; second mold 200; second recess 201; release film 300.

DETAILED DESCRIPTION

Some embodiments of the present disclosure will be described below in detail with reference to the accompanying drawings, but not intended to limit the present disclosure.

In the present disclosure, where the contrary is not stated, the terms "on" and "below" used usually refer to the up and down of the device in actual use or working condition, specifically the directions in the attached drawings; The terms "inside" and "outside" refer to the outline of the device.

In view of defects of the light boards in the related art, such as large deformation of the driver backplane and poor brightness uniformity of the LED array, a light board, a method of manufacturing the light board, and a spliced display device are provided in the present disclosure.

Figure 2:
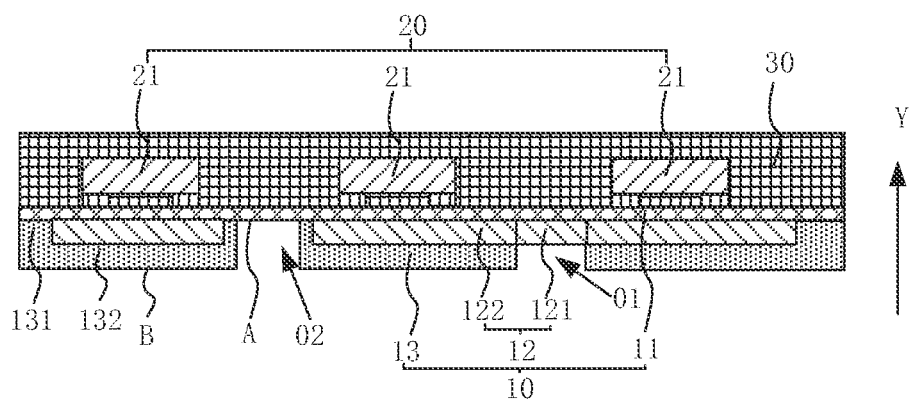
FIG. 2 is a schematic view showing a film layer structure in a partial area of a light board according to an embodiment of the present disclosure.
Figure 3:
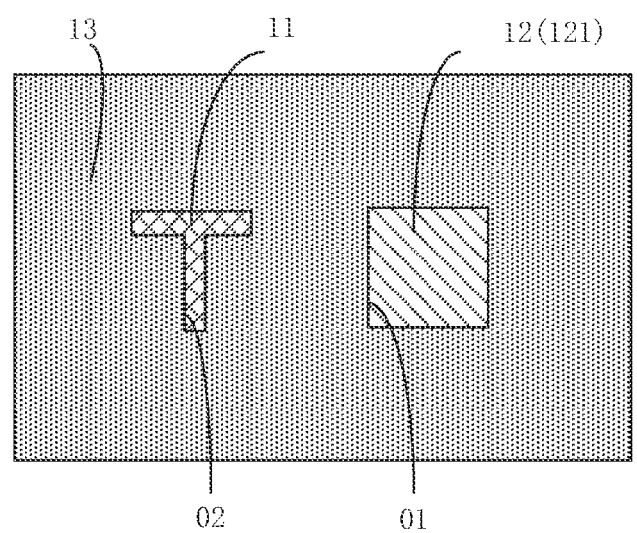
FIG. 3 is a schematic plane view of the light board in FIG. 2 projected along the Y direction.

In a first aspect, light boards are provided in embodiments of the present disclosure. Specifically, FIG. 2 is a schematic view showing a film layer structure in a partial area of the light board according to an embodiment of the present disclosure, and FIG. 3 is a schematic plane view of the light board in FIG. 2 projected along the Y direction. As shown in FIG. 2 and FIG. 3, the light board includes a light-emitting unit array 20 and a driver backplane 10. The light-emitting unit array 20 includes a plurality of light-emitting units 21 arranged in an array. The driver backplane 10 is disposed on a backlight side of the light-emitting unit array 20 and is electrically connected to the light-emitting units 21. The driver backplane 10 includes a base 11, a trace layer 12, and an insulating protection layer 13 stacked successively in a direction away from the light-emitting unit array 20. The trace layer 12 includes a plurality of traces 122 and one or more bonding terminals 121. The bonding terminals 121 are each electrically connected to one of the traces 122. An orthographic projection of the insulating protection layer 13 on the base 11 overlaps the traces 122. The insulating protection layer 13 includes one or more first openings 01. The first opening 01 exposes the bonding terminal 121. The insulating protection layer 13 is disposed on an outermost side of the driver backplane 10 away from the light-emitting unit array 20.

In the light board provided in the present disclosure, the bonding terminals 121 are disposed on a side of the base 11 away from the light-emitting unit array 20 and are each exposed from a corresponding one of the first openings 01 of the insulating protection layer 13. In this way, a framework adopted by the light board is a backside bonding framework. In the light board with the backside bonding framework, the plurality of light-emitting units 21 of the light-emitting unit array 20 are performed with an encapsulation process after electrically connected to the driver backplane 10. During the encapsulation process, a pressure is required on the driver backplane 10 from a side of driver backplane 10 away from the light-emitting unit array 20. When a height difference between points of the side of the driver backplane 10 away from the light-emitting unit array 20 is too large, it is easy to have the problem of large deformation of the driver backplane 10.

In the related art, because the outermost side of the driver backplane away from the light-emitting unit array is the white screen-printing ink, the side of the driver backplane away from the light-emitting unit array has the highest point on a surface of the white screen-printing ink away from the light-emitting unit array and the lowest point on a surface of trace layer away from the light-emitting unit array. A thickness of the white screen-printing ink is large, and a black ink layer configured to protect the trace layer is provided between the white screen-printing ink and the trace layer, so an overall thickness of the black ink layer and the white screen-printing ink after stacked is large. Thus, the height difference between the points of the side of the driver backplane away from the light-emitting unit array is large.

In the light board provided in the present disclosure, because the orthographic projection of the insulating protection layer 13 on the base 11 overlaps the traces 122, the insulating protection layer 13 plays a protective role on the traces 122, thereby ensuring stability of the driver backplane 10 during working. Because the insulating protection layer 13 is disposed at the outermost side of the driver backplane 10 away from the light-emitting unit array 20, the problem of the large height difference between the points of the side of the driver backplane away from the light-emitting unit array caused by the black ink layer and the white screen-printing ink is avoided. Thus, deformation of the driver backplane is relieved, brightness uniformity of the light-emitting unit array is improved, and display effect of the light board is improved.

Optionally, the plurality of light-emitting units 21 of the light-emitting unit array 20 are provided with a variety of different colors, such as red light-emitting units, green light-emitting units, and blue light-emitting units. The light-emitting units 21 are, for example, LEDs. It should be noted that a size of the LED is not limited in embodiments of the present disclosure.

In some embodiments of the present disclosure, the insulating protection layer 13 further includes one or more second openings 02 each exposing the base 11, and the second openings 02 are each misaligned with the traces 122. The second openings 02 form at least one dentification pattern.

In the related art, the white screen-printing ink plays a role of identification through forming a patterned structure. Relatively, in the light board provided in the present disclosure, a same role as the white screen-printing ink in the related art is played by misaligning the second opening 02 and the traces 122. A flatness of the light board is further improved by defining the opening instead of a prominent arrangement of the insulating protection layer 13.

Optionally, the insulating protection layer 13 refers to a black ink layer. Because there is a more obvious color difference between the black ink layer and the base 11, the second opening 02 formed by patterning the black ink layer can be directly used as the dentification pattern. A type of the dentification pattern defined by the second opening 02 is not limited in the present disclosure, such as a numeric code, a language code or a bar code, an QR code, etc.

In some embodiments of the present disclosure, the insulating protection layer 13 includes a first part 131 and a second part 132. The first part 131 is disposed on a surface of the base 11 away from the light-emitting unit array 20, and the second part 132 is disposed on a surface of the traces 122 away from the light-emitting unit array 20. A first distance between a surface of the first part 131 away from the base 11 and the base 11 is equal to a second distance between a surface of the second part 132 away from the base 11 and the base 11.

In the light board provided in the present disclosure, the first distance is equal to the second distance, so a thickness of a part of the insulating protection layer 13 disposed on the side of the trace 122 away from the light-emitting unit array 20 is less than a thickness of another part of the insulating protection layer 13 disposed on the surface of the base 11 away from the light-emitting unit array 20. Thus, a flatness of the surface of the insulating protection layer 13 away from the light-emitting unit array 20 is better, so as to further improve resistance to pressure of the driver backplane 10, reduce the deformation of the driver backplane 10 during the encapsulation process, and improve the brightness uniformity of the light board.

Moreover, a thickness of the first part 131 is equal to a sum of a thickness of the second part 132 and a thickness of the trace 122. Herein, the thickness of the second part 132 is less than or equal to 10 μm, and the thickness of the trace 122 ranges from 15 μm to 25 μm.

In the light board provided in the present disclosure, a lowest point A of the side of the driver backplane 10 away from the light-emitting unit array 20 is a point of the side of the base 11 away from the light-emitting unit array 20, and a highest point B is a point of the side of the second part 132 away from the light-emitting unit array 20. The thickness of the second part 132 is controlled less than 10 μm in the present disclosure, so a maximum value of the height difference between the points of the side of the driver backplane 10 away from the light-emitting unit array 20 is further reduced. Thus, the resistance to pressure of the driver backplane 10 is further improved and the deformation of the driver backplane 10 during the encapsulation process is further reduced.

In some embodiments of the present disclosure, a thickness of the driver backplane 10 is less than or equal to 0.6 mm.

Specifically, the thickness of the driver backplane 10 is less than or equal to 0.6 mm, so the overall thickness of the light board is thicker. Thus, the light board including the driver backplane 10 can be applied in spliced display devices and make the spliced display devices have excellent display effect. Optionally, the driver backplane 10 may be a printed circuit board (PCB for short), such as a hard PCB or a flexible PCB. For example, the driver backplane 10 is a hard PCB.

In some embodiments of the present disclosure, the light board further includes an encapsulation adhesive layer 30. The encapsulation adhesive layer 30 is disposed on a surface of the light-emitting unit array 20 away from the driver backplane 10. The encapsulation adhesive layer 30 includes epoxy resin glue.

In the related art, generally used encapsulation adhesives include encapsulation adhesive tapes and silica gel. However, the encapsulation adhesive tapes are not suitable for the light boards with the backside bonding framework, and the silica gel cannot form a good encapsulation form during a pressing process in the encapsulation process, which leads to unsatisfactory encapsulation effect. The epoxy resin glue is adopted as a material of the encapsulation adhesive layer 30 in the present disclosure, so as to further improve the encapsulation effect of the encapsulation adhesive layer 30, ensure stability in used of the light board, and extend a service life of the light board.

In some embodiments of the present disclosure, the light board further includes a driver chip (not shown in the drawings). The driver chip is electrically connected to the bonding terminals 121 of the driver backplane 10. The driver chip includes an optical compensation module.

In the light board provided in the present disclosure, the driver chip is electrically connected to the bonding terminals 121 of the driver backplane 10, so a driving signal is provided through the driver backplane 10 to the plurality of light-emitting units 21 of the light-emitting unit array 20, thereby performing the display function of the light board. The optical compensation module is provided in the driver chip in the present disclosure, so brightness of each light-emitting unit 21 of the light board is compensated, thereby further improving the brightness uniformity of the light board.

Specifically, the optical compensation module is a demura module. The demura module obtains mura display statuses at different positions of the light board by reading demura data of the light board stored in a flash memory, and then input image data is provided with appropriate data compensation according to a mura degree of its corresponding position, so as to reduce the mura degree of the image displayed by the light board. The demura data of the light board stored in the flash memory is obtained by using a high-precision camera to obtain brightness of all the light-emitting units 21 in the front view during a production process of each light board, and then through targeted measurement and calculation of the software. A group of demura data of the light board s only applicable to the corresponding light board.

Figure 4:
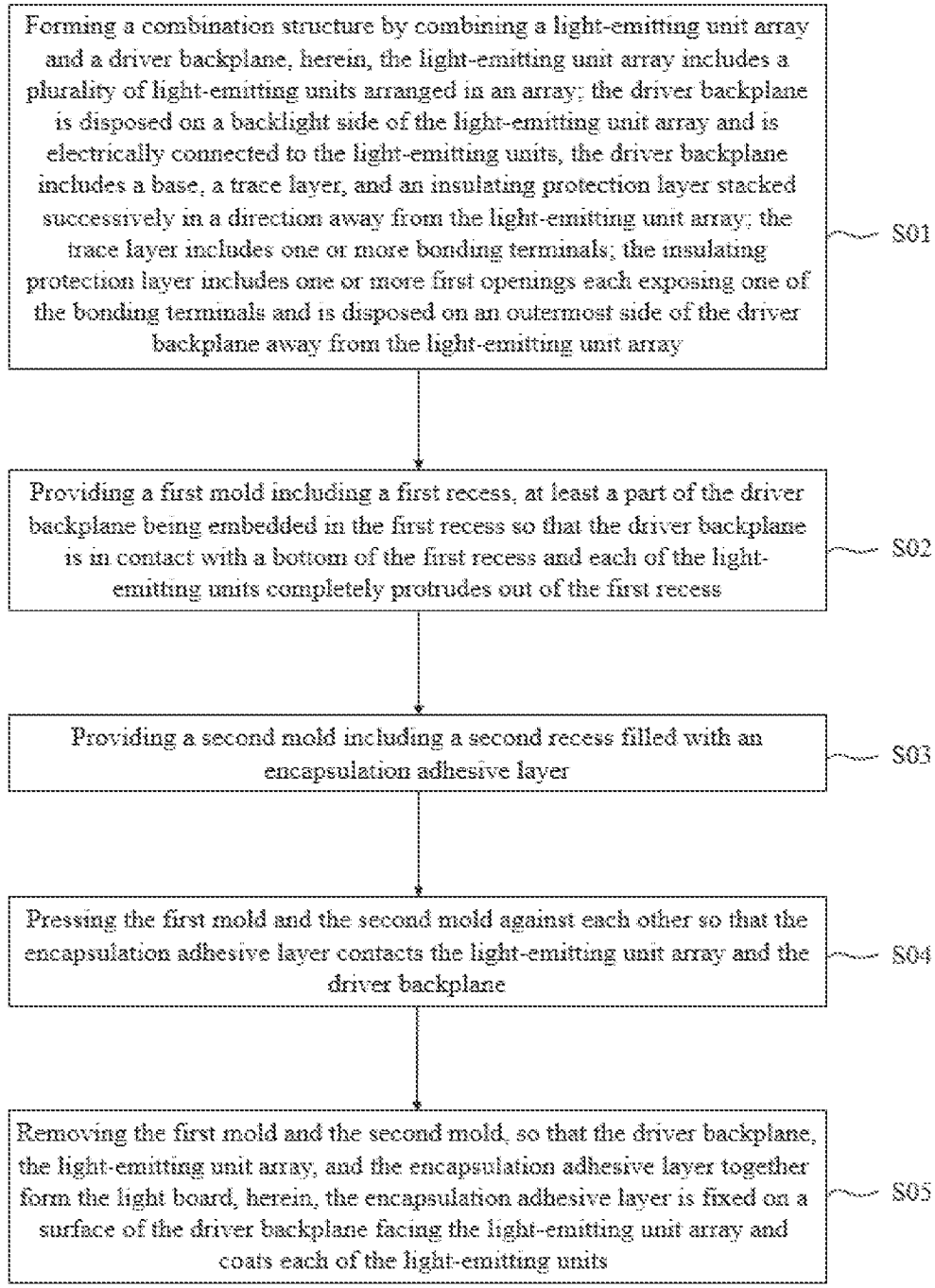
FIG. 4 is a schematic flowchart of a process for manufacturing the light board provided in embodiments of the present disclosure.
Figure 5:
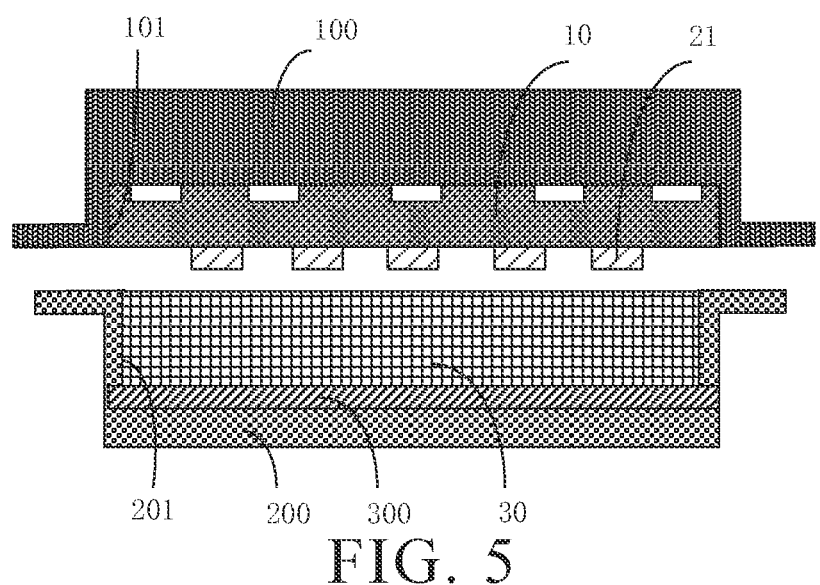
FIG. 5 is a schematic structural view of a first mold and a second mold before they are pressed against each other according to an embodiment of the present disclosure.

In a second aspect, methods of manufacturing a light board are provided in embodiments of the present disclosure. FIG. 4 is a schematic flowchart of a process for manufacturing the light board according to an embodiment of the present disclosure. FIG. 5 is a schematic structural view of a first mold and a second mold before they are pressed against each other according to an embodiment of the present disclosure. As shown in FIG. 2 to FIG. 5, the method of manufacturing the light board provided in an embodiment of the present disclosure includes a step S01, a step S02, a step S03, a step S04, and a step S05.

Herein, the step S01 is: forming a combination structure by combining a light-emitting unit array 20 and a driver backplane 10, herein, the light-emitting unit array 20 includes a plurality of light-emitting units 21 arranged in an array; the driver backplane 10 is disposed on a backlight side of the light-emitting unit array 20 and is electrically connected to the light-emitting units 21, the driver backplane 10 includes a base 11, a trace layer 12, and an insulating protection layer 13 stacked successively in a direction away from the light-emitting unit array 20; the trace layer 12 includes one or more bonding terminals 121; the insulating protection layer 13 includes one or more first openings 01 each exposing one of the bonding terminals 121 and is disposed on an outermost side of the driver backplane 10 away from the light-emitting unit array 20.

The step S02 is: providing a first mold 100 including a first recess 101, at least a part of the driver backplane 10 being embedded in the first recess 101 so that the driver backplane 10 is in contact with a bottom of the first recess 101 and each of the light-emitting units 21 of the light-emitting unit array 20 completely protrudes out of the first recess 101.

The step S03 is: providing a second mold 200 including a second recess 201 filled with an encapsulation adhesive layer.

The step S04 is: pressing the first mold 100 and the second mold 200 against each other so that the encapsulation adhesive layer 30 contacts the light-emitting unit array 20 and the driver backplane 10.

The step S05 is: removing the first mold 100 and the second mold 200, so that the light-emitting unit array 20, and the encapsulation adhesive layer 30 together form the light board, herein, the encapsulation adhesive layer 30 is fixed on a side of the driver backplane 10 facing the light-emitting unit array 20 and coats each of the light-emitting units 21, and the driver backplane 10.

Herein, in the step S01, the insulating protection layer 13 further includes one or more second openings 02 forming a dentification pattern. The trace layer 12 further includes a plurality of traces 122, and the bonding terminals 121 are electrically connected to each one of the traces 122. The second openings 02 each expose the base 11 and are each misaligned with the traces 122. An orthographic projection of the insulating protection layer 13 on the base 11 overlaps the traces 122. The first openings 01 and the second openings 02 are formed by chemical etching or laser irradiation.

Herein, in the step S02, the light-emitting units 21 of the light-emitting unit array 20 are completely protruded out of the first recess 101, so the driver backplane 10 is completely hold in the first recess 101, that is, a maximum thickness of the driver backplane 10 is equal to a depth of the first recess 101. Of course, in other embodiments of the present disclosure, the driver backplane 10 may be partially embedded in the first recess 101, that is, the maximum thickness of the driver backplane 10 may also be greater than the depth of the first recess 101.

Herein, in the step S03, the encapsulation adhesive layer 30 includes epoxy resin glue. Moreover, during the step S03, the epoxy resin glue is in a liquid phase. Optionally, a thickness of the encapsulation adhesive layer 30 may be less than or equal to a depth of the second recess 201. When the thickness of the encapsulation adhesive layer 30 is equal to the depth of the second recess 201, the encapsulation adhesive layer 30 completely fill the second recess 201. When the thickness of the encapsulation adhesive layer 30 is less than the depth of the second recess 201, a release film 300 is provided between a bottom of the second recess 201 and the epoxy resin glue, and the release film 300 is configured to separate the epoxy resin glue apart from the bottom the second recess 201, so as to prevent the encapsulation adhesive layer 30 from being difficult to peel off the second recess 201 after the pressing process in the step S04. Optionally, the depth of the second recess 201 ranges, for example, from 250 µm to 350 µm, such as 250 µm, 300 µm, or 350 µm.

Herein, during the step S04, the first mold 100 and the second mold 200 are opposite to and separated from each other, the first mold 100 fixes the combination structure right above the encapsulation adhesive layer 30, an orthographic projection of the driver backplane 10 on the encapsulation adhesive layer 30 coincides the encapsulation adhesive layer 30. After the step S04, the encapsulation adhesive layer 30 has been fixed on the side of the driver backplane 10 facing the light-emitting unit array 20 and has coated the light-emitting units 21. Optionally, after the step S04, the epoxy resin glue is in a solid phase.

Herein, during the step S05, the first mold 100 is moved and the second mold 200 is fixed, alternatively the second mold 200 is moved and the first mold 100 is fixed, in this way, the light board, which remains relatively fixed with the first mold 100, is separated apart from the second mold 200, so as to remove the second mold 200. And then the light board is separated apart from the first mold 100, so as to remove the first mold 100.

In a third aspect, spliced display devices are further provided in embodiments of the present disclosure. The spliced display device includes a plurality of display panels and one or more above light boards. Any two adjacent ones of the display panels are spliced with each other, and each of the display panels includes a display area and a non-display area. The light boards are each disposed on a light-emitting side of the display panels and correspond to the non-display areas of the spliced display panels. Herein, the light boards may be fixed to the light-emitting side of the display panels after the display panels are spliced, or be fixed to the light-emitting side of the manufactured display panel in the unit of a single display pane. Optionally, the plurality of display panels include LCD panels and/or organic light-emitting diode (OLED for short) display panels.

In some embodiments of the present disclosure, a thickness of the driver backplane 10 is less than or equal to 0.6 mm, the thickness of the driver backplane 10 is less than or equal to 0.6 mm, so an overall thickness of the light board is thicker. Thus, when the light board including the driver backplane 10 is applied in the spliced display device, a height difference between the light board and the display panel is smaller, so as to make the spliced display device have excellent display effect.

In summary, among the light boards, the methods of manufacturing the light board, and the spliced display devices provided in the present disclosure, the light board includes the light-emitting unit array and the driver backplane, the light-emitting unit array includes the plurality of light-emitting units arranged in an array, the driver backplane is disposed on the backlight side of the light-emitting unit array, the driver backplane includes the base, the trace layer, and the insulating protection layer stacked successively in the direction away from the light-emitting unit array, the trace layer includes the plurality of traces and one or more bonding terminals each electrically connected to one of the traces, the orthographic projection of the insulating protection layer on the base overlaps the traces, the insulating protection layer includes one or more first openings each exposing one of the bonding terminals, and the insulating protection layer is disposed at the outermost side of the driver backplane away from the light-emitting unit array. In the light board provided in the present disclosure, the height difference between points of the side of the driver backplane away from the light-emitting unit array is reduced, so as to relieve the deformation of the driver backplane, improve the brightness uniformity of the light-emitting unit array, and improve display effect of the light board.

The light boards, the methods of manufacturing the light board, and the spliced display devices according to some embodiments of the present disclosure have been described above in detail. Those skilled in the art can make various changes and modifications without departing from the spirit of the present disclosure. Therefore, the described embodiments are not intended to limit the present disclosure.

What is claimed is:

1. A light board, comprising:
    a light-emitting unit array, comprising a plurality of light-emitting units arranged in an array; and
    a driver backplane, disposed on a backlight side of the light-emitting unit array, electrically connected to the light-emitting units, and comprising a base, a trace layer, and an insulating protection layer stacked successively in a direction away from the light-emitting unit array; and wherein
    the trace layer comprises a plurality of traces and one or more bonding terminals each electrically connected to one of the traces;
    an orthographic projection of the insulating protection layer on the base overlaps the traces, and the insulating protection layer comprises one or more first openings each exposing one of the bonding terminals; and
    the insulating protection layer is disposed on an outermost side of the driver backplane away from the light-emitting unit array.

2. The light board of claim 1, wherein the insulating protection layer further comprises one or more second openings each exposing the base and being each misaligned with the traces, and the second openings form at least one dentification pattern.

3. The light board of claim 2, wherein the insulating protection layer is a black ink layer.

4. The light board of claim 2, wherein
    the insulating protection layer comprises a first part disposed on a surface of the base away from the light-emitting unit array and a second part disposed on a surface of the traces away from the light-emitting unit array; and
    a first distance between a surface of the first part away from the base and the base is equal to a second distance between a surface of the second part away from the base and the base.

5. The light board in claim 4, wherein a thickness of the second part is less than or equal to 10 μm.

6. The light board of claim 1, further comprising an encapsulation adhesive layer disposed on a side of the light-emitting unit array away from the driver backplane.

7. The light board of claim 6, wherein the encapsulation adhesive layer comprises epoxy resin glue.

8. The light board of claim 1, wherein a thickness of the driver backplane is less than or equal to 0.6 mm.

9. A method of manufacturing a light board, comprising:
    forming a combination structure by combining a light-emitting unit array and a driver backplane, wherein the light-emitting unit array comprises a plurality of light-emitting units arranged in an array; the driver backplane is disposed on a backlight side of the light-emitting unit array and is electrically connected to the light-emitting units, the driver backplane comprises a base, a trace layer, and an insulating protection layer stacked successively in a direction away from the light-emitting unit array; the trace layer comprises one or more bonding terminals; the insulating protection layer comprises one or more first openings each exposing one of the bonding terminals and is disposed on an outermost side of the driver backplane away from the light-emitting unit array;
    providing a first mold comprising a first recess, at least a part of the driver backplane being embedded in the first recess so that the driver backplane is in contact with a bottom of the first recess and each of the light-emitting units completely protrudes out of the first recess;
    providing a second mold comprising a second recess filled with an encapsulation adhesive layer;
    pressing the first mold and the second mold against each other so that the encapsulation adhesive layer contacts the light-emitting unit array and the driver backplane; and
    removing the first mold and the second mold, so that the driver backplane, the light-emitting unit array, and the encapsulation adhesive layer together form the light board, wherein the encapsulation adhesive layer is fixed on a surface of the driver backplane facing the light-emitting unit array and coats each of the light-emitting units.

10. The method of manufacturing the light board of claim 9, wherein the first openings are formed by chemical etching or laser irradiation in the forming of the combination structure.

11. A spliced display device, comprising:
    a plurality of display panels, each comprising a display area and a non-display area, and any two adjacent ones of the display panels being spliced with each other; and
    one or more light boards, each disposed on a light-emitting side of the display panels, and each at least corresponding to the non-display area of a spliced one of the display panels, and the light boards each comprising:
    a light-emitting unit array, comprising a plurality of light-emitting units arranged in an array; and
    a driver backplane, disposed on a backlight side of the light-emitting unit array, electrically connected to the light-emitting units, and comprising a base, a trace layer, and an insulating protection layer stacked successively in a direction away from the light-emitting unit array; and wherein
    the trace layer comprises a plurality of traces and one or more bonding terminals each electrically connected to one of the traces;
    an orthographic projection of the insulating protection layer on the base overlaps the traces, and the insulating protection layer comprises one or more first openings each exposing one of the bonding terminals; and
    the insulating protection layer is disposed on an outermost side of the driver backplane away from the light-emitting unit array.

12. The spliced display device of claim 11, wherein the insulating protection layer further comprises one or more second openings each exposing the base and being each misaligned with the traces, and the second openings form at least one dentification pattern.

13. The spliced display of claim 12, wherein the insulating protection layer is a black ink layer.

14. The spliced display of claim 12, wherein
the insulating protection layer comprises a first part disposed on a surface of the base away from the light-emitting unit array and a second part disposed on a surface of the traces away from the light-emitting unit array; and
a first distance between a surface of the first part away from the base and the base is equal to a second distance between a surface of the second part away from the base and the base.

15. The spliced display of claim 14, wherein a thickness of the second part is less than or equal to 10 μm.

16. The spliced display of claim 11, wherein the light board further comprises an encapsulation adhesive layer disposed on a side of the light-emitting unit array away from the driver backplane.

17. The spliced display of claim 16, the encapsulation adhesive layer comprises epoxy resin glue.

18. The spliced display of claim 11, wherein a thickness of the driver backplane is less than or equal to 0.6 mm.

\* \* \* \* \*